(12) United States Patent
Baker et al.

(10) Patent No.: US 9,264,695 B2
(45) Date of Patent: Feb. 16, 2016

(54) SYSTEM AND METHOD FOR MULTI-VIEWPOINT VIDEO CAPTURE

(75) Inventors: Henry Harlyn Baker, Los Altos, CA (US); Henry Sang, Jr., Cupertino, CA (US); Nelson Liang An Chang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 644 days.

(21) Appl. No.: 13/641,523

(22) PCT Filed: May 14, 2010

(86) PCT No.: PCT/US2010/035026
§ 371 (c)(1),
(2), (4) Date: Oct. 16, 2012

(87) PCT Pub. No.: WO2011/142767
PCT Pub. Date: Nov. 17, 2011

(65) Prior Publication Data
US 2013/0044181 A1   Feb. 21, 2013

(51) Int. Cl.
*H04N 13/02* (2006.01)
*H04N 5/232* (2006.01)
(Continued)

(52) U.S. Cl.
CPC ............ *H04N 13/0242* (2013.01); *G03B 35/08* (2013.01); *G03B 37/04* (2013.01); *H04N 5/23238* (2013.01)

(58) Field of Classification Search
CPC ........... H04N 5/23238; H04N 13/0242; G03B 37/04; G03B 35/08
USPC .......................................................... 348/36
See application file for complete search history.

(56) References Cited

U.S. PATENT DOCUMENTS

2003/0038756 A1   2/2003   Blume et al.
2003/0169627 A1   9/2003   Liu
(Continued)

FOREIGN PATENT DOCUMENTS

CN   1725857 A   1/2006
WO   WO-9625710 A1   8/1996
(Continued)

OTHER PUBLICATIONS

European Search Report, issued Jul. 30, 2014, in related EP application 10851520.6.
(Continued)

*Primary Examiner* — Tat Chio
*Assistant Examiner* — Nguyen Truong
(74) *Attorney, Agent, or Firm* — Hewlett Packard Patent Dept.

(57) ABSTRACT

Embodiments of the present invention disclose a system and method for multi-viewpoint video capture. According to one embodiment, the system includes a camera housing for accommodating both a first multi-imager set and a second multi-imager set, with each multi-imager set including a plurality of optical cameras having different viewpoint directions and configured to produce a source image. Furthermore, each camera in the first multi-imager set and the second multi-imager set include corresponding cameras facing in approximately the same viewpoint direction. The first multi-imager set is positioned laterally adjacent to the second multi-imager set such that lines joining a center of projection of corresponding cameras in the first multi-imager set and second multi-imager set are approximately parallel.

16 Claims, 7 Drawing Sheets

(51) Int. Cl.
*G03B 35/08* (2006.01)
*G03B 37/04* (2006.01)

(56) References Cited

U.S. PATENT DOCUMENTS

| | | |
|---|---|---|
| 2005/0088515 A1 | 4/2005 | Geng |
| 2006/0023066 A1 | 2/2006 | Li et al. |
| 2006/0146142 A1 | 7/2006 | Arisawa et al. |
| 2006/0227417 A1 | 10/2006 | Grover |
| 2007/0030342 A1 | 2/2007 | Wilburn et al. |
| 2007/0081091 A1 | 4/2007 | Pan et al. |
| 2007/0126863 A1 * | 6/2007 | Prechtl et al. ............ 348/43 |
| 2008/0298674 A1 | 12/2008 | Baker et al. |
| 2009/0021614 A1 | 1/2009 | Baker et al. |

FOREIGN PATENT DOCUMENTS

| | | |
|---|---|---|
| WO | WO-02065786 A1 | 8/2002 |
| WO | WO-2006110584 A2 | 10/2006 |
| WO | WO-2009123705 A2 | 10/2009 |
| WO | WO-2009144729 | 12/2009 |

OTHER PUBLICATIONS

PCT; "Notification of Transmittal of the International Search Report and the Written Opinion of the International Searching Authority, or the Declaration"; cited in PCT/US2010/035026; mailed Feb. 18, 2011; 9 pages.

Wilburn, B., et al.; "High Performance Imaging Using Large Camera Arrays"; Jul. 2005; 14 pages.

Wilson, Mark; "Panasonic Camcorder Packs Two Lenses for Full HD in 3D"; Gismodo; Apr. 30, 2009; 4 pages.

* cited by examiner

SYSTEM AND METHOD FOR MULTI-VIEWPOINT VIDEO CAPTURE

CROSS-REFERENCE TO RELATED APPLICATION

This application is a national stage application under 35 U.S.C. §371 of PCT/US2010/35026, filed May 14, 2010.

BACKGROUND

The functionality and performance of video acquisition systems has changed drastically within the last decade. For example, such video systems have advanced from standard definition video capture to high definition video capture and from two-dimensional video acquisition to three-dimensional video capture and output. In particular, sports broadcast and video capture methods require large numbers of operations personnel, detailed and taxing mechanical procedures, and complex equipment. Furthermore, as the demand for three-dimensional video increases, this task becomes even more challenging and expensive.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which.

NOTATION AND NOMENCLATURE

Certain terms are used-throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . . ". The term "couple" or "couples" is intended to mean either an indirect or direct connection. Thus, if a first component couples to a second component, that connection may be through a direct electrical connection, or through an indirect electrical connection via other components and connections, such as an optical electrical connection or wireless electrical connection. Furthermore, the term "system" refers to a collection of two or more hardware and/or software components, and may be used to refer to an electronic device or devices, or a sub-system thereof.

For purposes of the following discussion the term "composite image" is intended to refer to an image that is formed from two or more acquired or captured images. Moreover, the term "mosaicking" is intended to refer to the process of creating seamless composite images. The term "source image" is intended to refer to images from which a composite image is formed. The term "imager" or "sensor" is intended to refer to a component of a camera system that captures images. The term "homography" is intended to refer to a mathematical object that relates the perspectives of source images. In one embodiment, these homographies are determined by constraints shared by source images and are utilized to combine those source images seamlessly.

DETAILED DESCRIPTION OF THE INVENTION

The following discussion is directed to various embodiments. Although one or more of these embodiments may be preferred, the embodiments disclosed should sot be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Conventional sporting event cinematography calls upon teams of separate camera operators distributed around the event field. At each site, constant framing and focusing actions are required for maintaining the availability of real-time and viewer-read video for delivery. The personnel necessary to facilitate this process often includes an operator, a focus puller, and a digital imaging technician to maintain adjustment of the multitude of variables available when using the digital medium. Still farther, more advanced cinema capture means may include a technician for signal synchronization and yet another operator to physically move the camera to capture different viewpoints of the sporting event. Accordingly, a typical sports broadcast may involve a team of six to eight operators and therefore the number of participants and cost can be substantial.

The move to extend standard video coverage to three-dimensions multiplies the burden on the camera operators and taxes their ability to deliver real-time and viewer-ready product. In addition to the original aesthetic issues of focus and framing are the new concerns that three-dimensional video brings of operating without inducing viewer discomfort or fatigue. That is, three-dimensional video presentation must add to the viewer's experience and not lead to nausea or other oft-cited irritation issues caused during extended exposure of the presentation. These side effects may arise when the imaging and presentation of a video does not align exactly with the viewer's perceptual expectation. Accordingly, embodiments of the present invention provide a system and method for reducing the complexity and burden of manual control during such video capture by eliminating a large part of the headcount needed for its operation, while also providing an opportunity for a more immersive visual experience.

Embodiments in accordance with the present invention provide a camera system configured for panoramic capture of multi-viewpoint imagery. In particular, embodiments allows for a video capture system configured to acquire ultra-high resolution and all-encompassing views of a scene from many perspectives simultaneously, thereby supporting immersive viewing of sport and similar large-format events. Furthermore, a number of advantages are afforded by the camera configuration of the present embodiments. For example, operation of the system is free of mechanical actuation, with no panning, tilting, focusing, zooming, etc. effected other than through digital processing such that all framing and other video editing decisions can be made centrally at a video integration site. Still further, multiple panoramic images can be acquired simultaneously and from as many viewpoints as desired for the sought effect. As a result, embodiments provide for an immersive viewing experience in which any viewing aspect ratio can be achieved, and in which the major burden on camera operators is eliminated and the number of operating personnel reduced to a minimum. Based on computational enhancement and the arrangement of imagers, the present embodiments are capable of presenting economic and quality advantages over conventional sports video capture methods.

Figure 1:
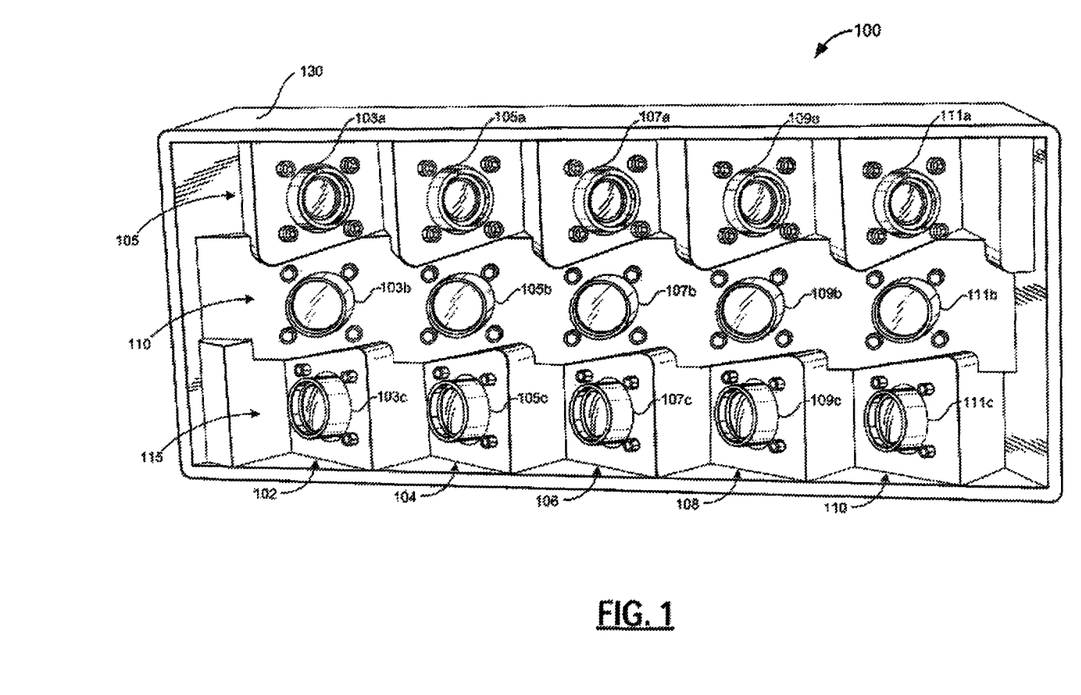
FIG. 1 is a three-dimensional perspective view of a multi-viewpoint video capture system according to an embodiment of the present invention.

Referring now in more detail to the drawings in which like numerals identify corresponding parts throughout the views, FIG. 1 is a three-dimensional perspective view of a multi-viewpoint video capture system according to an embodiment of the present invention. As shown here, the camera system includes a camera body or housing 130 for enclosing a plurality of multi-imager sets 102, 104, 106, 108, and 110. According to this exemplary embodiment, each multi-imager set 102, 104, 106, 108, and 110 includes three optical cameras or sensors. For example, multi-imager set 102 includes optical sensors 103a, 103b, and 103c, multi-imager set 104 includes optical sensors 105a, 105b, and 105c, multi-imager 106 includes optical sensors 107a, 107b, and 107c, multi-imager set 108 includes optical sensors 109a, 109b, and 109c, and multi-imager set 110 includes optical sensors 111a, 111b, and 111c. Each optical sensor within each multi-imager set 102-110 is configured to capture a respective source image from their respective viewpoint as will be explained in detail with reference to FIG. 2A. Still further, in synchronized video capture, the plurality of sensors are configured to operate at a very high combined resolution, while permitting the stitching together of panoramic views through integration of numerous individual captures.

According to one embodiment, the multi-viewpoint video camera system 100 is oriented for left-to-right panoramic image capture. More specifically, each optical sensor 103a, 105a, 107a, 109a, and 111a represent corresponding cameras facing in substantially the same viewpoint or viewing direction (e.g. leftward). Meanwhile, optical sensors 103b, 105b, 107b, 109b, and 111b represent corresponding cameras facing in approximately the same viewpoint direction (e.g. central). Still further, optical sensors 103c, 105c, 107c, 109c, and 111c represent corresponding cameras facing in a near identical viewing direction (e.g. rightward). For three-dimensional video capture, a center of projection of each camera positioned along horizontal camera rows 105, 110, and 115 should be collinear. The viewing direction, center of projection, and linearity of each camera in the multi-imager set will be described in further detail with reference to FIGS. 3A-3C.

Figure 2A:
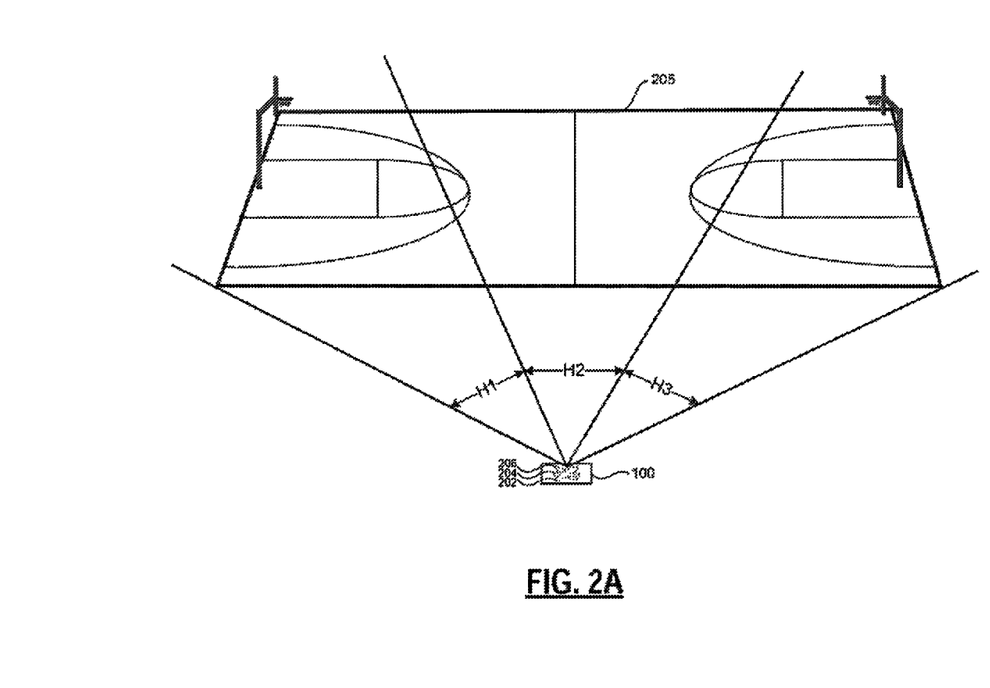
FIG. 2A is a perspective view of a multi-viewpoint video capture system in a sports broadcast environment according to an embodiment of the present invention.

FIG. 2A is a perspective view of a multi-viewpoint video capture system in a sports broadcast environment according to an embodiment of the present invention. In the present embodiment, the multi-viewpoint camera system is utilized in the broadcast of a basketball game. As shown here, each optical sensor 202, 204, and 206 is configured to have varying viewpoints and associated horizontal view zones H1-H3 in order to capture respective source images and provide a composite panoramic image of the entire basketball court 205. According to one embodiment, the viewpoints and horizontal view zones H1, H2, H3 of each optical sensor 202, 204, and 206 respectively should be close together so as to allow for optimal panoramic imaging in which the cameras 202-206 behave (optically) similar to a single camera system. According to one embodiment, each optical camera is configured for epipolar structuring such that the transitive character of the camera permits arbitrary resampling across any acquired image. In particular, the exemplary imagers 202, 204, 206 may be placed a dozen or so millimeters apart so as to minimize the potential for double imaging by reducing imager-to-imager disparity at overlap areas as shown in FIG. 2A (i.e., each sensor has a defined horizontal view zone). Alternatively, imagers 202, 204, 206 may also be configured and utilized to increase overlap areas of their respective horizontal view zones H1, H2, and H3.

Figure 2B:
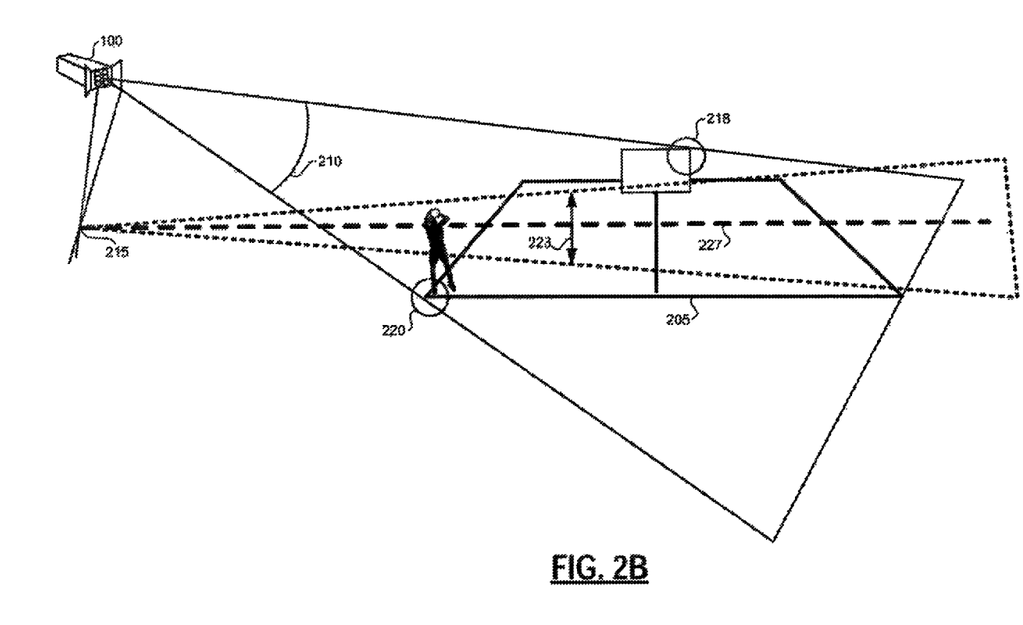
FIG. 2B is another perspective view of a multi-viewpoint video capture system in a sports broadcast environment according to an embodiment of the present invention.

FIG. 2B is another perspective view of a multi-viewpoint video capture system in a sports broadcast environment according to an embodiment of the present invention. This particular embodiment demonstrates how the Scheimpflug view-camera principle is utilized to position the plane of focus 227 horizontally within the activity context (e.g. basketball game). In particular, and according to one embodiment, each camera of the multi-imager system is configured to have their lenses pitched downward at a small angle. This pitch 215, also called the Scheimpflug inclination, tilts the plane of focus in the scene such that the plane defined by the imager's image plane 210, which spans the lower and upper range of the view frustum (i.e. from near the floor edge 220 and top edge of the backboard 218), and the focal plane intersect along a line below the video capture camera system 100. A particular lens inclination is selected such that the resulting focus plane passes through the playing/activity area (i.e. basketball court) at an elevation and with a depth of field 223 that meets the focus needs of the system. Moreover, the formal of video capture is not constrained to a certain formal (e.g. 4:3, 16:9), and may be defined to match the shape or format of the activity being observed.

Figure 3A:
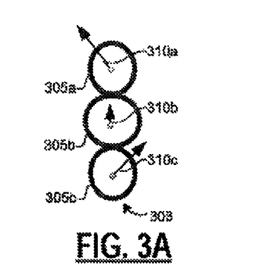
FIGS. 3A and 3B are rear and top down views of a single mosaicking panoramic imager arrangement.
Figure 3B:
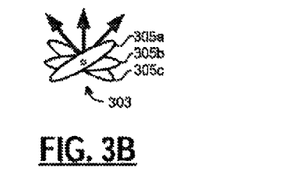

FIGS. 3A-5C are illustrations of various configurations of optical cameras within the multi-viewpoint video capture system according to an embodiment of the present invention. FIGS. 3A and 3B are rear and top views of a single mosaicking panoramic set of imagers. As shown in FIG. 3A, multi-imager set 303 includes optical cameras 305a, 305b, and 305c oriented in viewpoint directions 310a, 310b, and 310c respectively. That is, camera 305a has a viewing direction 310a that faces in a leftward direction, camera 305b has a viewing direction 310b that faces in a central direction, and camera 305c has a viewpoint direction that faces in a rightward direction. When viewed from a top perspective as in FIG. 3B, each camera lens appears to have a near-common vertical axis with respect to their center of projection (indicated by gray circle) in which camera 305a overlaps camera 305b, which overlaps camera 305c. Furthermore, each camera 305a-305c is configured to have an orientation yaw to provide just-abutting views of a particular scene.

Figure 4A:
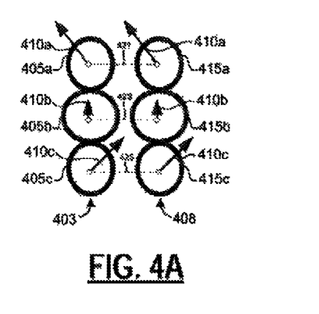
FIGS. 4A and 4B are rear and top down views of a binocular mosaicking panoramic imager arrangement according to one embodiment of the present invention.
Figure 4B:
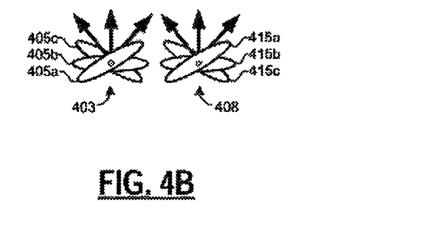

FIGS. 4A and 4B depict rear and top views of a binocular mosaicking panoramic imager arrangement. As shown in FIG. 4A, the camera arrangement includes two multi-imager sets 403 and 408 positioned side by side so that each multi-imager set includes corresponding cameras having viewing directions that are laterally displaced from each other. More specifically, multi-imager set 403 includes optical cameras 405a, 405b, and 405c that are positioned laterally adjacent to multi-imager set 408 including optical cameras 415a, 415b, and 415c such that corresponding cameras 405a and 415a have a substantially conforming leftward viewing direction 410a, cameras 405b and 415b have an approximate corresponding central viewing direction 410b, and cameras 405c and 415c have a substantially congruent rightward viewing direction 410c.

Furthermore, and as shown in FIG. 4B, each camera lens of each multi-imager set 403 and 408 are shown here for simplicity to have a near common vertical axis with respect to their center of projection (indicated by gray circle) in which cameras 405a and 415a overlap cameras 405b and 415b, which overlap cameras 405c and 415c. In particular, a line joining a center of projection of each corresponding camera is approximately parallel. For example, in the present embodiment lines 421, 423, and 425, which join corresponding cameras 405a-410a, 405b-410b, and 405c-410c respectively are substantially parallel with each other. Moreover, cameras 405a-405c and 415a-415c of each multi-imager set 403 and 408 are configured for simultaneous binocular video acquisition, thereby enabling panoramic three-dimensional video capture and the generation of a binocular-stereoscopic lateral-disparity image.

Figure 5A:
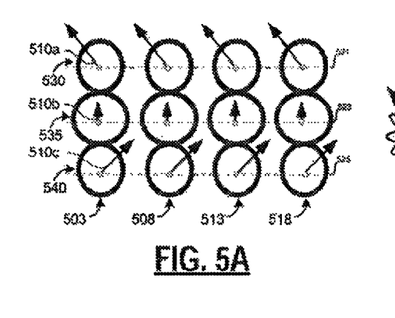
FIGS. 5A and 5B are rear and top down views of a binocular mosaicking panoramic imager arrangement according to one embodiment of the present invention.
Figure 5B:
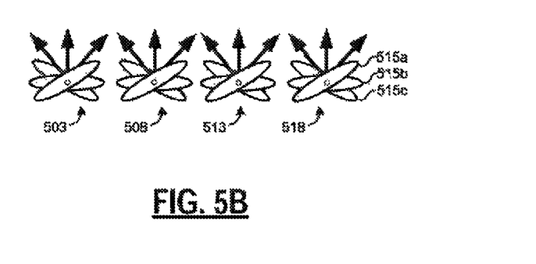

FIGS. 5A and 5B depict a rear and top view of a multi-view mosaicking panoramic imager arrangement. As shown in exemplary embodiment of FIG. 5A, the multi-viewpoint camera system includes four multi-imager sets 503, 508, 513, and 518. Similar to the previous embodiment shown in FIG. 4A, each multi-imager set is arranged side-by-side, or laterally adjacent, such that corresponding cameras have viewing directions that are laterally displaced from each other. That is, the upper row 530 of cameras for multi-imager sets 503, 508, 513, and 518 have substantially congruent leftward viewpoint directions 510a, the center row 535 of cameras in multi-imager sets 503, 508, 513, and 518 have substantially congruent central viewpoint directions 510a, while the lower row 540 of cameras for multi-imager sets 503, 508, 513, and 518 have substantially congruent rightward viewpoint directions 510a. Still further, the centers of projection (indicated by gray circle) of corresponding cameras are collinear. For example, the centers of projection for the upper row 530 of cameras lie along line 521 (i.e. collinear points), the centers of projection for the center row 535 of cameras lie along line 523, while the centers of projection for the lower row 540 of cameras lie along line 525.

As shown in the top down exemplary view of FIG. 5B, each camera within each multi-imager set 503-518 may be arranged to have a near common vertical axis with respect to their center of projection such that the upper cameras overlap the central cameras, which overlap the lower cameras. However, the vertical arrangement is simply a structural simplification in accordance with one embodiment of the present invention as each imager of multi-imager sets 503-518 need only be proximal in order to minimize the possibility of double imaging from the varied centers of projection. In accordance with an exemplary embodiment, each camera within a multi-imager set may be configured to capture source images for rendering a composite panoramic image, while the plurality of multi-imager sets may be utilized for providing multiple viewpoints of the panoramic image. Accordingly, embodiments of the present invention provide cameras positioned for joint use in mosaicking (i.e. capturing the panorama), while others are positioned for capturing multiple such mosaics from disparate viewpoints (i.e. multi-viewpoint or three-dimensional capture) so as to generate a multi-scopic lateral-disparity image.

Figure 6A:
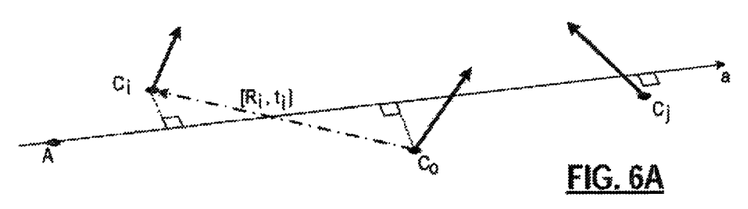
FIGS. 6A-6C are graphical illustrations of the baseline algorithm in initializing the camera homographies according to an embodiment of the present invention.
Figure 6B:
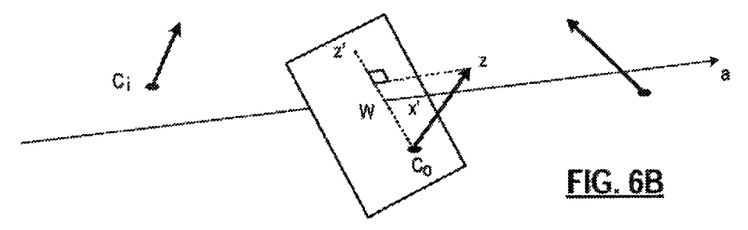
Figure 6C:
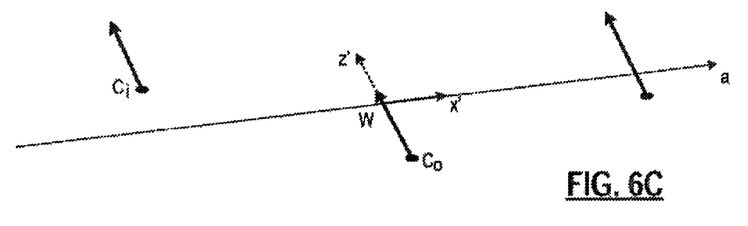

FIGS. 6A-6C are graphical illustrations of the baseline algorithm in initializing the camera epipolar rectification according to one embodiment of the present invention. The baseline algorithm is intended to compensate for the fact that strict colineraity and strict parallelism in these imager arrangements are generally not attainable in mechanical assemblies and so the nearest solution that minimizes the resulting imprecision is desired. According to the present embodiment, the baseline algorithm starts with full geometric checkerboard calibration for example. As shown in FIG. 6A, a line l is fit to the resulting camera centers which minimizes the orthogonal distance to all camera centers. Here, line l is represented by a three-dimensional point A and direction a, which may be chosen as the baseline. Next, and as shown in FIG. 6B, C0 is rotated so that its x-axis is aligned with a. In order to minimize the distortion due to rotating images, the z-axis of the reference camera C0 is orthogonally projected onto plane P, which serves as the new z' axis, while the y' axis becomes the cross-product of x' and z'. Still further, the coordinate frame is moved to W by denoting a reference orientation, Rw=[x'; y'; z']. Thereafter, the processor calculates the pose of each camera with respect to W, rotating each camera so its optical axis is perpendicular to x' and parallel to z' as shown in FIG. 6C. In one embodiments, this rotation process is implemented as a homography. Accordingly, an ideal multi-baseline system can be approximated by the cameras of the multi-imager system without moving their centers of projection.

Figure 7:
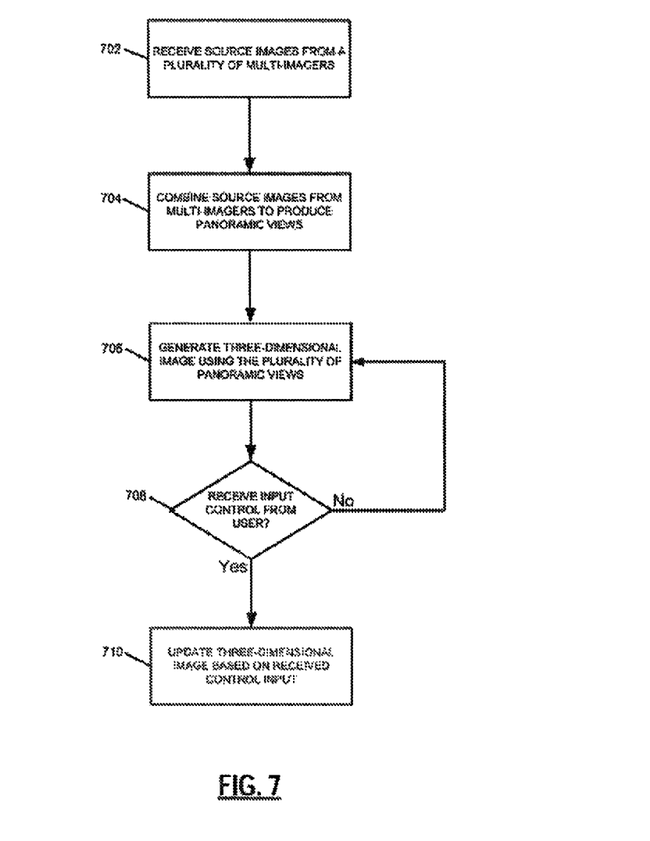
FIG. 7 shows a flowchart of the processing stops performed in a method for multi-viewpoint video capture according to an embodiment of the present invention.

FIG. 7 shows a flowchart of the processing steps performed in a method for multi-viewpoint video capture according to embodiments of the present invention. In step 702, the processor receives a plurality of source images from a plurality of multi-imager sets as described above. In one embodiment, at least two multi-imager sets are utilized in order to provide panoramic and three-dimensional video capture. In step 704, the processor combines the source images from each multi-imager set to produce a plurality of panoramic views. As described above, each sensor within the multi-imager set is configured to capture image data from a disparate viewpoint, thus enabling the mosaicking of a composite panoramic image by the image processor. According to an exemplary embodiment, the multi-viewpoint system includes at least two multi-imagers such that the processor can generate at least two panoramic images from the received source images. A three-dimensional image is then generated in step 706 using the plurality of panoramic images. Furthermore, a remote operator at a video integration site may send a control input to the image processor in order to edit the generated three-dimensional image in step 708. For example, the operator may elect to alter the reference orientation specified, by R2=[x', y', z'], or select a specific multi-imager subset, or digitally pan or zoom only a portion of the panoramic views, etc. Thereafter, in step 710, the processor adjusts and updates the three-dimensional image based on the received control input.

Figure 8:
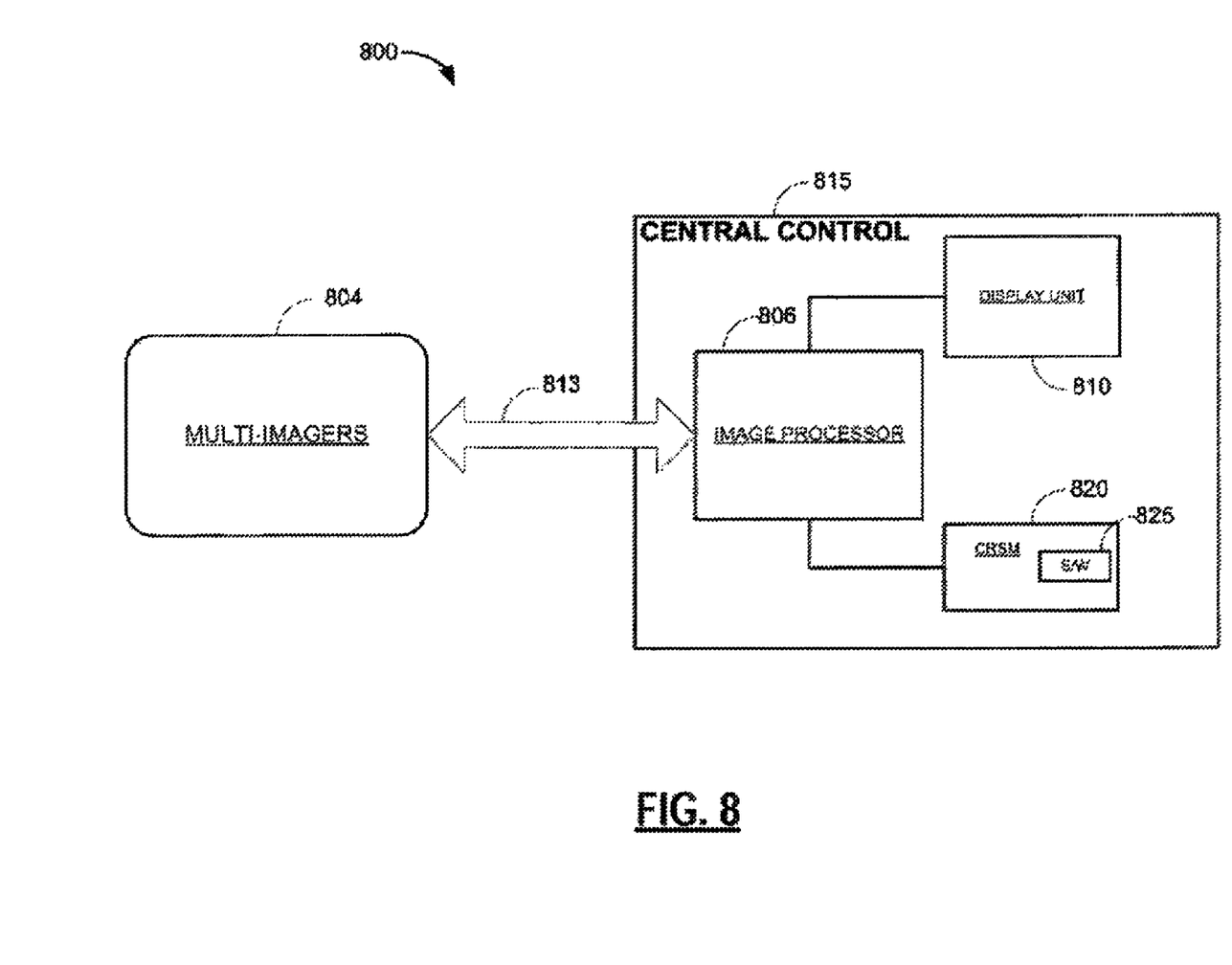
FIG. 8 is a block diagram of an exemplary system implementing multi-viewpoint video capture according to an embodiment of the present invention.

FIG. 8 is a block diagram of an exemplary system implementing multi-viewpoint video capture according to an embodiment of the present invention. As shown in this exemplary embodiment, the system 800 includes a plurality of multi-imagers configured to transmit data to an image processor 806 at a video integration site 815 via connection 813, which may be a wired connection using a fiber optical or similar data cable, or wirelessly over a wireless network. Moreover, the video integration site 815 also includes a display unit 810 and a computer-readable storage medium 820. Display unit 810 represents an electronic visual display configured to display images to an operator, while storage medium 820 represents volatile storage (e.g. random access memory), non-volatile store (e.g. hard disk drive, read-only memory, compact disc read only memory, flash storage, etc.), or combinations thereof. Furthermore, storage medium 820 includes software 825 that is executable by processor 806 and, that what executed, causes die processor 806 to perform some or all of the functionality described herein. A feature of the multi-viewpoint video capture system of the present embodiments is the ability to provide for autonomous video capture such that video-processing and editing can occur remotely. In particular, high resolution video capture permits remote digital frame selection and zoom. That is, there is no need for an operator for on-site mechanical action as all digital processing can be handled centrally. For example, a central operator at the remote video integration site 815 may select certain panoramic views using display unit 810 for removal of anomalous or rivalrous artifacts to ensure better viewer reception.

Embodiments of the present invention, provide a panoramic multi-viewpoint camera system that overcomes shortcomings of conventional video capture methods. More specifically, the multi-viewpoint camera system of the present invention allow for automation, with computational analysis in the video chain working to ensure that perceptual constraints on three-dimensional viewing are met, while also providing a special camera design invoked alongside real-time analysis to ensure quality video capture. Accordingly, much of the burden is eliminated from the camera operator, thus enabling centralized planning, strategic selection, and effortless framing with constant in-focus operation, all while reducing operator team size and attaining a higher qualify product.

Still further, several video processing advantages are afforded by the configuration of the multi-viewpoint video capture system of the present embodiments. For example, stereo baseline can be adapted to position the viewer's perspective at any depth in the scene (e.g. could present three-dimensional scene as viewed from mid-court of a basketball game). Furthermore, the multi-viewpoint video may be utilized for range analysis and responsive control (i.e. digital panning to follow action, etc.). Moreover, such a camera system presents the possibility of placing size-reduced but capability-enhanced imaging technology in more inaccessible locations preferred by viewers. Combined with panoramic display—including stereo panoramic display—the video capture system of the present embodiments may enable development of new experiences in immersive entertainment.

Furthermore, while the invention has been described with respect to exemplary embodiments, one skilled in the art will recognize that numerous modifications are possible. For example, although exemplary embodiments depict and described a basketball court and game as the representative sports broadcast, the invention is not limited thereto. For example, the multi-imager video capture system of the present embodiments may be utilized for a football, baseball, boxing, hockey, soccer, or similar sporting event or large-scale video broadcast.

Furthermore, each multi-imager set in the video capture system in accordance with embodiments of the present invention may include two, four, or any other number of optical cameras instead of the three sensor arrangement depicted in the present embodiments. Similarly, the multi-imager video capture system may include more than live multi-imager sets. Thus, although the invention has been described with respect to exemplary embodiments, it will be appreciated that the invention is intended to cover all modifications and equivalents within the scope of the following claims.

What is claimed is:

1. A system comprising:
   a camera housing;
   a first multi-imager set within the camera housing and including a plurality of first cameras, wherein each respective first camera has a different viewpoint direction from a center of projection of the respective first camera; and
   a second multi-imager set within the camera housing and including a plurality of second cameras, wherein each respective second camera has a different viewpoint direction from a center of projection of the respective second camera, wherein the centers of projection of the first cameras are along a first common axis, and the centers of projection of the second cameras are along a second common axis, the first common axis being parallel to the second common axis, the first common axis being perpendicular to each of the different viewpoint directions of the first cameras, and the second common axis being perpendicular to each of the different view point directions of the second cameras,
   wherein the first multi-imager set is positioned laterally adjacent to the second multi-imager set such that a first line joining the centers of projection of corresponding first and second cameras in the first multi-imager set and the second multi-imager set are parallel to a second line joining the centers of projection of corresponding further first and second cameras in the first multi-imager set and the second multi-imager set, and wherein the first common axis and the second common axis are each perpendicular to the first line and the second line.

2. The system of claim 1, further comprising:
   an image processor configured to combine source images produced by the first cameras in the first multi-imager set to produce a first panoramic view, and combine source images produced by the second cameras in the second multi-imager set to produce a second panoramic view.

3. The system of claim 2, wherein the image processor is further configured to generate a three-dimensional image based on the first panoramic view and the second panoramic view.

4. The system of claim 1, wherein each of the first multi-imager set and the second multi-imager set includes at least three cameras having different viewpoint directions.

5. The system of claim 4, wherein both the first multi-imager set and the second multi-imager set include cameras having a leftward viewing direction, cameras having a central viewing direction, and cameras having a rightward viewing direction.

6. The system of claim 1, further comprising:
   at least one additional multi-imager set positioned within the camera housing and including a plurality of cameras, wherein each camera of the additional multi-imager set has a different viewpoint direction.

7. The system of claim 6, wherein the at least one additional multi-imager set is positioned laterally adjacent to either the first multi-imager set or the second multi-imager set such that a center of projection of each camera in the at least one additional multi-imager set is approximately collinear with the center of projection of the corresponding camera in each of the first multi-imager set and the second multi-imager set.

8. The system of claim 1, wherein a first camera of the first multi-imager set and a second camera of the second multi-imager set face in a first viewpoint direction, and wherein another first camera of the first multi-imager set and another second camera of the second multi-imager set face in a second viewpoint direction.

9. A method comprising:
receiving, by a system comprising a processor, a plurality of source images from a first multi-imager set including a plurality of first cameras and a second multi-imager set including a plurality of second cameras, wherein each respective first camera has a different viewpoint direction from a center of projection of the respective first camera, and each respective second camera has a different viewpoint direction from a center of projection of the respective second camera, wherein the first multi-imager set is positioned laterally adjacent to the second multi-imager set such that a first line joining the centers of projection of corresponding first and second cameras is parallel to a second line joining the centers of projection of corresponding further first and second cameras, wherein the centers of projection of the first cameras are along a first common axis, and the centers of projection of the second cameras are along a second common axis, the first common axis being parallel to the second common axis, the first common axis being perpendicular to each of the different viewpoint directions of the first cameras, and the second common axis being perpendicular to each of the different viewpoint directions of the second cameras, and wherein the first common axis and the second common axis are each perpendicular to the first line and the second line;
combining, by the system, the source images of the first multi-imager set to produce a first panoramic view;
combining, by the system, the source images of the second multi-imager set to produce a second panoramic view; and
generating, by the system, a three-dimensional image based on the first panoramic view and the second panoramic view.

10. The method of claim 9, further comprising:
automatically adjusting, by the system, the generated three-dimensional image based on a control input received from a user.

11. The method of claim 9, wherein a first camera of the first multi-imager set and a second camera of the second multi-imager set face in a first viewing direction, and wherein another first camera of the first multi-imager set and another second camera of the second multi-imager set face in a second viewpoint direction.

12. The method of claim 9, wherein both the first multi-imager set and the second multi-imager set include corresponding cameras having a leftward viewing direction, corresponding cameras having a central viewing direction, and corresponding cameras having a rightward viewing direction.

13. The method of claim 12, wherein at least one additional multi-imager set is positioned laterally adjacent to either the first multi-imager set or the second multi-imager set such that a center of projection of each camera in the at least one additional multi-imager set is approximately collinear with the center of projection of the corresponding cameras in both the first multi-imager set and the second multi-imager set.

14. A non-transitory computer readable storage medium for multi-viewpoint video capture having stored executable instructions, that when executed by a processor, cause the processor to:
receive a plurality of source images from a first multi-imager set including a plurality of first cameras and a second multi-imager set including a plurality of second cameras, wherein each respective first camera has a different viewpoint direction from a center of projection of the respective first camera, and each respective second camera has a different viewpoint direction from a center of projection of the respective second camera, wherein the first multi-imager set is positioned laterally adjacent to the second multi-imager set such that a first horizontal line joining the centers of projection of corresponding first and second cameras is parallel to a second horizontal line joining the centers of projection of corresponding further first and second cameras, wherein the centers of projection of the first cameras are along a first common vertical axis, and the centers of projection of the second cameras are along a second common vertical axis, the first common vertical axis being perpendicular to each of the different viewpoint directions of the first cameras, and the second common vertical axis being perpendicular to each of the different viewpoint directions of the second cameras;
combine the source images of the first multi-imager set to produce a first panoramic view;
combine the source images of the second multi-imager set to produce a second panoramic view, and
generate a three-dimensional image based on the first panoramic view and the second panoramic view.

15. The non-transitory computer readable storage medium of claim 14, wherein the executable instructions further cause the processor to:
automatically adjust the generated three-dimensional image based on a control input received from a user.

16. The non-transitory computer readable storage medium of claim 14, wherein a first camera of the first multi-imager set and a second camera of the second multi-imager set face in a first viewpoint direction, and wherein another first camera of the first multi-imager set and another second camera of the second multi-imager set face in a second viewpoint direction.

* * * * *

UNITED STATES PATENT AND TRADEMARK OFFICE
CERTIFICATE OF CORRECTION

PATENT NO.         : 9,264,695 B2                               Page 1 of 1
APPLICATION NO.    : 13/641523
DATED              : February 16, 2016
INVENTOR(S)        : Henry Harlyn Baker et al.

It is certified that error appears in the above-identified patent and that said Letters Patent is hereby corrected as shown below:

In the claims:
In column 8, lines 23-24, in Claim 1, delete "view point" and insert -- viewpoint --, therefor.

Signed and Sealed this
Second Day of August, 2016

Michelle K. Lee
*Director of the United States Patent and Trademark Office*